United States Patent
Garimella et al.

(10) Patent No.: US 9,514,154 B2
(45) Date of Patent: Dec. 6, 2016

(54) VIRTUAL FILE SYSTEM INTERFACE FOR COMMUNICATING CHANGES OF METADATA IN A DATA STORAGE SYSTEM

(75) Inventors: Neeta Garimella, San Jose, CA (US); Bernhard J. Klingenberg, Morgan Hill, CA (US); Ryan J. Minniear, Folsom, CA (US); Mark A. Smith, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 888 days.

(21) Appl. No.: 13/283,540

(22) Filed: Oct. 27, 2011

(65) Prior Publication Data

US 2013/0110787 A1    May 2, 2013

(51) Int. Cl.
*G06F 17/30* (2006.01)

(52) U.S. Cl.
CPC ... *G06F 17/30235* (2013.01); *G06F 17/30073* (2013.01)

(58) Field of Classification Search
CPC .................. G06F 17/30073; G06F 17/30067
USPC ........................................................ 707/667
See application file for complete search history.

(56) References Cited

U.S. PATENT DOCUMENTS

| | | | |
|---|---|---|---|
| 5,819,292 A | 10/1998 | Hitz et al. | |
| 6,081,807 A | 6/2000 | Story et al. | |
| 6,185,661 B1 | 2/2001 | Ofek et al. | |
| 6,816,872 B1 | 11/2004 | Squibb | |
| 6,823,398 B1 | 11/2004 | Lee et al. | |
| 6,833,848 B1 | 12/2004 | Wolff et al. | |
| 7,155,460 B2 | 12/2006 | McGovern et al. | |
| 7,457,803 B1 | 11/2008 | Robusto et al. | |
| 7,590,807 B2 | 9/2009 | McGovern et al. | |
| 8,055,629 B2 | 11/2011 | Clark et al. | |
| 8,595,237 B1* | 11/2013 | Chaudhary | G06F 17/30619 707/741 |
| 2005/0027757 A1 | 2/2005 | Kiessig et al. | |
| 2006/0136516 A1 | 6/2006 | Jain et al. | |
| 2007/0179995 A1* | 8/2007 | Prahlad et al. | 707/202 |
| 2008/0154988 A1 | 6/2008 | Shiozawa et al. | |
| 2009/0077018 A1* | 3/2009 | Kaplan | G06F 17/3012 |
| 2009/0177721 A1* | 7/2009 | Mimatsu | H04L 67/322 |
| 2009/0177836 A1* | 7/2009 | Mimatsu | 711/111 |
| 2010/0088349 A1* | 4/2010 | Parab | 707/802 |

(Continued)

OTHER PUBLICATIONS

Preliminary Amendment, dated Dec. 22, 2009, for U.S. Appl. No. 12/042,533, filed Mar. 5, 2008, invented by Thomas Keith Clark et al., Total 5 pages.

(Continued)

*Primary Examiner* — Rehana Perveen
*Assistant Examiner* — Alexander Khong
(74) *Attorney, Agent, or Firm* — David W. Victor; Konrad, Raynes, Davda and Victor LLP

(57) ABSTRACT

Embodiments of the invention relate to a virtual file system for communicating changes in metadata associated with data archived in a data storage system to applications. An aspect of the invention concerns a system that comprises a virtual file system for storing metadata files wherein each metadata file is associated with an archived data file, and a virtual file system interface coupled to the virtual file system for exposing changes in the metadata files to the applications.

20 Claims, 7 Drawing Sheets

(56) References Cited

U.S. PATENT DOCUMENTS

| | | | |
|---|---|---|---|
| 2010/0287140 A1* | 11/2010 | Oza | G06F 9/542 707/640 |
| 2011/0029487 A1 | 2/2011 | Oliveira et al. | |
| 2012/0150827 A1* | 6/2012 | Ishii et al. | 707/692 |
| 2014/0033047 A1* | 1/2014 | Poling | G06F 3/048 715/730 |

OTHER PUBLICATIONS

Office Action, dated May 14, 2010, for U.S. Appl. No. 12/042,533, filed Mar. 5, 2008, invented by Thomas Keith Clark et al., Total 16 pages.

Response to Office Action, dated Aug. 15. 2010, for U.S. Appl. No. 12/042,533, filed Mar. 5, 2008, invented by Thomas Keith Clark et al., Total 11 pages.

Final Office Action, dated Oct. 29, 2011, for U.S. Appl. No. 12/042,533, filed Mar. 5, 2008, invented by Thomas Keith Clark et al., Total 12 pages.

Response to Final Office Action, dated Mar. 29, 2011, for U.S. Appl. No. 12/042,533, filed Mar. 5, 2008, invented by Thomas Keith Clark et al., Total 10 pages.

Notice of Allowance, dated Jun. 28, 2011, for U.S. Appl. No. 12/042,533, filed Mar. 5, 2008, invented by Thomas Keith Clark et al., Total 10 pages.

S.Quinlan, "A Cached Worm File System", dated Dec. 1991, Software-practice and Experience, vol. 21, No. 12, Total 11 pages.

Hitachi Data Systems "Content Archive Platform", dated 2007, (online) retrieved from the Internet on Feb. 26, 2008 at URL>http://www.hds.com/products/storage-systems/content-archive-platform/index.html, Total 3 pages.

A White Paper by IT Centrix "Hitachi's New Generation Active Archive Platform", dated 2006, (online), retrieved from the Internet at URL>http://www.hds.com/assets/pdf/itcentrix-white-paper-on-newgeneration-active-archive-platform.pdf, Total 11 pages.

IDC Product Flash, "HDSMakes Its Next Market Move with Context Archiving", dated 2007, (online) , retrieved from the Internet at URL>http://www.hds.com/assets/pdf/idc-hcapflash_June_2007.pdf, Total 2 pages.

Hitachi Content Archive Platform "An Active Archive Solution", dated May 2007, Hitachi Data Systems, (online), retrieved from the Internet at URL>http://www.hds.com/assets/pdf/contnet-archive-platform-an-active-archivesolution-br.pdf, Total 8 pages.

Archivas Digital Archiving "The Open Archive, Enabling Discovery", dated Mar. 4, 2008, (online), retrieved from the Internet at URL>http://www.archivas.com:8080/product_info/23_pdf_gn23/openarchive.pps.,Total 23 pages.

Archivas Digital Archiving "Preserving the Last Copy", dated 2004, (online), retrieved from the Interne at URL> http://www.archivas.com:8080/product_info/z3_pdfs_gh23/Archivas_preserving_last_copy.pdf, Total 18 pages.

* cited by examiner

VIRTUAL FILE SYSTEM INTERFACE FOR COMMUNICATING CHANGES OF METADATA IN A DATA STORAGE SYSTEM

BACKGROUND

The invention relates generally to computer data storage, and more particularly to a virtual file system interface for communicating changes related to archived data in a data storage system.

A data archive system typically stores data objects as files. In some cases, the archived files may be further processed to allow additional data processing functions to be performed on the archived data. For example, the archived files may be indexed to enable a search engine to search for desired information in certain fields of the archived data or to migrate the archived data to a lower-cost storage tier. Some data archive systems, such as IBM Information Archive®, may allow information concerning the archived data to be added to each file and provide mechanisms for updating such information even though the file data itself cannot be updated.

When information related to an archived file is changed, the archived file itself may need to be re-indexed because certain control data associated with the archived data might also have changed. Such an indexing and re-indexing of the archived data file may lead to error conditions that prevent the re-indexing from being completed successfully.

It is desirable to have an efficient mechanism for communicating changes related to data archived in a data storage system to applications that access the archived data.

BRIEF SUMMARY OF THE DISCLOSURE

The disclosure relates to a virtual file system for communicating changes in the metadata of the data archived in a data storage system to applications that access the archived data. The virtual file system may be provided in the data storage system coupled to host computers through which client computers may access the archived data, in the host computers, or in the client computers. One aspect of the disclosure concerns a system comprising a first virtual file system for storing metadata files wherein each metadata file is associated with an archived data file, and an interface coupled to the first virtual file system for exposing changes in the metadata files to applications using the archived data files.

A second aspect of the disclosure concerns a computer implemented method that comprises providing a virtual file system for storing metadata files wherein each metadata file is associated with an archived data file, and exposing, through an interface coupled to the virtual file system, changes in the metadata files to applications using the archived data files.

A third aspect of the disclosure concerns a computer program product comprising a computer readable storage medium having computer readable program code embodied therewith. The computer readable program code comprises program code configured to provide a virtual file system for storing metadata files wherein each metadata file is associated with an archived data file, and program code configured to expose, through an interface coupled to the virtual file system, changes in the metadata files to applications using the archived data files.

The details of the embodiments of the disclosure, both as to their structure and operation, are described below in the Detailed Description section in reference to the accompanying drawings. The Brief Summary is intended to identify key features of the claimed subject matter, but it is not intended to be used to limit the scope of the claimed subject matter.

DETAILED DESCRIPTION

Figure 1:
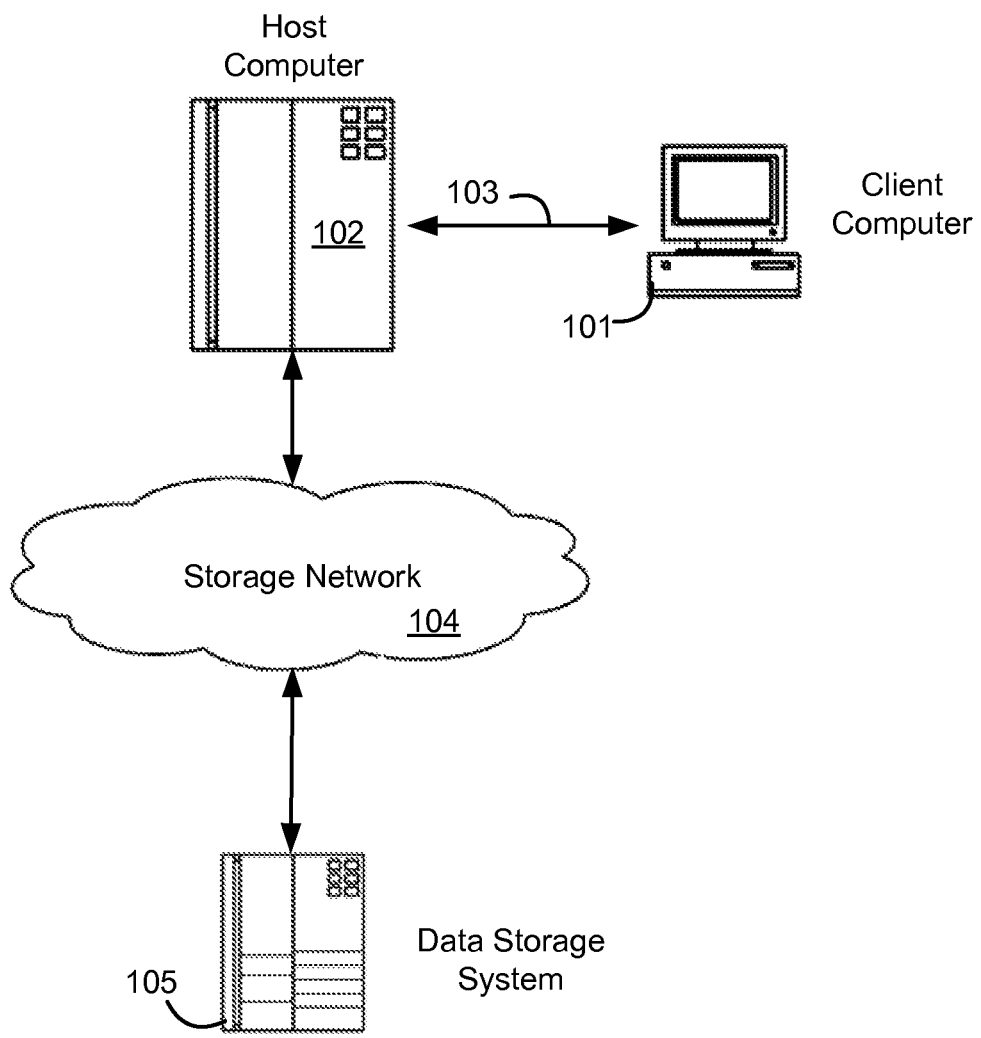
FIG. 1 illustrates an exemplary configuration of computers, a computer network, and a data storage system in which aspects of the invention may be provided.

The disclosure describes exemplary embodiments of systems, methods, and computer program products for providing a virtual file system interface to communicate metadata related to data archived in a data storage system. The embodiments may be applicable to computer applications that handle data other than archived data and to computer systems other than data storage systems. The invention is described in exemplary embodiments with reference to the figures, in which like numbers represent the same or similar elements. It will be appreciated by those skilled in the art that variations may be accomplished in view of these teachings without deviating from the spirit or scope of the invention.

Metadata associated with archived data files is often changed after the archived data files have been stored in a data storage system. Such changes may include references to file versions, change dates, authorship, notes about the file contents, and other miscellaneous information pertaining to the data files. For example, a set of engineering drawings may have references to later versions of the drawings, the names of people working on the follow-on designs, and other drawing details and information that are generally not included in the drawings. Data concerning the stored data, e.g., the archived engineering drawing data in this example, is referred to as metadata of the archived data. Metadata may include control information and may be reside in a control file associated with the archived data file.

In addition to metadata generated by users, archived data may comprise metadata generated by computer applications that access, process, or use the archived data. For example, the files containing the archived data may be indexed by a database application to allow the database application or a search engine to search in certain fields of the archived data for desired data items or to migrate the archived data to a lower-cost storage system. Some data archive systems such as the Information Archive® (IA) products marketed by International Business Machines Corporation, allow metadata to be added to each file and provide mechanisms for updating this metadata even though the file data itself cannot be updated, i.e., the data files are immutable. The archived files would need to be re-indexed once their metadata are updated. However, this indexing and re-indexing operation is prone to errors due to a number of reasons and consumes additional computer resources, which needs to be avoided.

One method for handling changes to the metadata associated with the archived data is to store the metadata in a relational database separate from the archived data. In this case, a re-indexing function may be implemented outside of the data archive storage. However, such an implementation would need to be customized for each individual application requirement. In addition, the problem domain for each implementation may be significantly different from other implementations and require extensive integration of various applications in a deployment of the implementation.

Another solution for accommodating metadata associated archived data files is the Windows alternate data streams provided in certain Windows operating systems. Windows is a trademark of Microsoft corporation in the United States and other jurisdictions. The Windows alternate data streams allow multiple data streams to be added to a file associated with the stored data. However, this capability is only available to Windows systems and requires the applications to be aware of the alternate data streams in order to interact with a system that uses the Windows alternate data streams.

In order to efficiently expose changes to the metadata of the archived files to applications running on different operating systems, embodiments of the invention provide a virtual file system interface that may be compatible with standard file protocols for communicating metadata of archived data to the applications.

Referring now to the drawings and in particular to FIG. 1, there is illustrated an example of a computer and data storage configuration in which aspects of the disclosure may be implemented. The computer and data storage configuration in FIG. 1 is presented only by way of example and is not intended to be limiting. The systems and methods disclosed herein may be used in a wide range of computers, servers, storage systems, and network architectures, in addition to the configuration in FIG. 1. The illustrated configuration may comprise a client computer 101 that accesses a host computer 102 through a connection 103. The connection 103 may be a wide area network (WAN), a local area network (LAN), a private intranet, or the Internet.

The host computer 102 may include CPUs (Central Processing Units) and memory for executing various programs, thereby providing a variety of computing functions to client computer 101. For example, the host computer 102 may be a server that hosts applications for providing computing services such as web services and database applications. In certain embodiments, host computer 102 may comprise an IBM System Z® computer, such as System z9®, System z10®, zSeries®, etc. The host applications running on computer 102 may include a storage management program for managing the operation of data storage systems in the illustrated configuration.

The computer and data storage configuration in FIG. 1 may include one or more storage system 105 for storing data. Multiple storage systems 105 may be connected to each other and to the host 102 by a storage network 104. The storage network 104 may be a storage area network (SAN), a LAN (Local Area Network), a Fibre Channel interface or other host interface protocols. A SAN is a dedicated high performance network between servers and storage resources, such as Fibre Channel (FC), Enterprise Systems Connection (ESCON), Small Computer Systems Interface (SCSI), Internet SCSI (iSCSI), Serial Storage Architecture (SSA), High Performance Parallel Interface (HIPPI), or other protocols with similar functions.

In certain embodiments, storage network 104 may comprise one or more network switches such as router switches. The network switches may comprise Enterprise Systems Connection (ESCON) switches, a FICON (Fiber Connectivity) switches, and/or combinations thereof that couple host computer 102 to the storage system 105.

Figure 2:
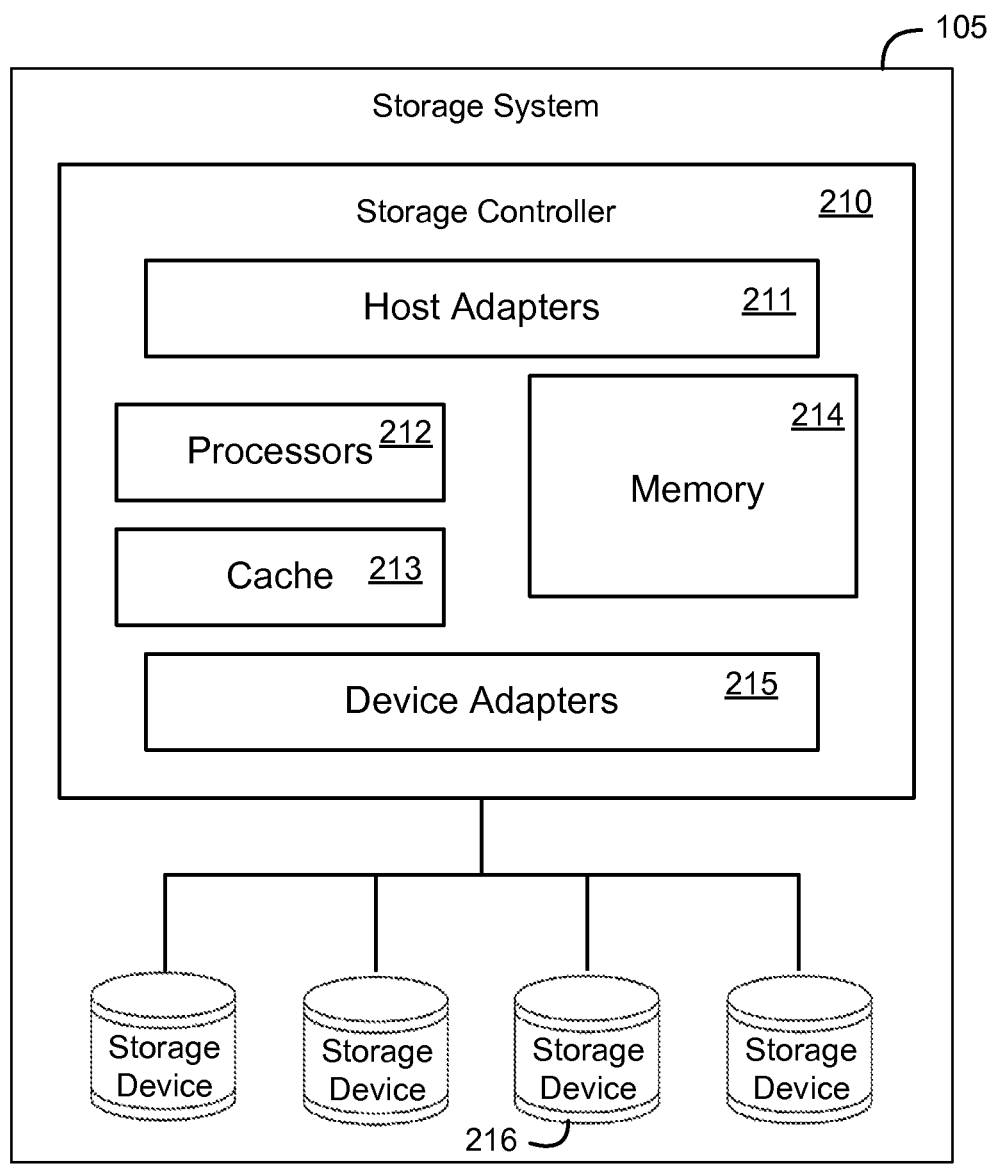
FIG. 2 illustrates a block diagram of main components in an exemplary data storage system that may be used with a virtual file system interface, in accordance with an embodiment of the invention.

A data storage system 105 may comprise hard disk drives, solid state drives, arrays of hard disk drives or solid-state drives, tape drives, tape libraries, CD-ROM libraries, or the like. Further, the data storage system 105 may comprise multiple storage levels such as a primary level of solid state storage, a secondary level of disk storage, and a third level of tape libraries. Host computer 102 may generate data and provide data to the storage system 105 to be stored on storage devices that the storage systems have access to, as illustrated in FIG. 2. Host computer 102 may similarly read data from data storage system 105.

A data storage system 105 may include one or more storage controllers, disk arrays and tape libraries. For example, storage system 105 may comprise IBM TotalStorage™ systems DS8000®. The DS8000® systems are high-performance, high-capacity storage controllers providing disk storage to support continuous operations. In another embodiment, a storage system 105 may be an IBM System Storage™ TS3500® tape library system. Users and computer programs may store data on storage system 105 and retrieve data from them, using various data processing applications running in the host 102 and the storage system 105.

FIG. 2 is a block diagram of the components in an exemplary data storage system 105 that may be used for providing aspects of the invention. The data storage system 105 may comprise a storage controller 210 that is connected to a plurality of data storage devices 216. The storage controller 210 may comprise one or more host adapters 209 that are connected to a storage network 105. Host adapters 211 allow the storage controller 210 to communicate with host 102 using an host-device I/O interface protocol such as Fibre Channel (FC), Fibre Channel Arbitration Loop (FC-AL), Infiniband, Gigabit Ethernet, Ethernet, TCP/IP, iSCSI, SCSI I/O interface. Each host adapter 211 may include one or more I/O ports, e.g., ESCON ports.

The storage controller 210 may communicate with the data storage devices 216 using an I/O protocol which may include without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA). A data storage device 216 generally includes an information storage medium such as a magnetic disk, magnetic tape, CD, DVD (Digital Versatile Disk), HD-DVD (High Definition DVD), BD (Blue-Ray Disk) and the like. In other embodiments, the information storage medium may comprise a PROM, EPROM, EEPROM, Flash PROM, compact flash, smart media, a holographic medium, and the like.

The storage controller 210 may include one or more processors 212 for controlling and performing the operation of the storage controller 210, and communicating with the host computer 102 and data storage devices 216. The storage controller 210 may comprise one or more units of memory 214 and cache 213 for holding computer program instructions and data associated with the control and processing functions in the storage controller 210. Cache 213 is a high-speed memory for temporarily storing data and quickly accessing the temporary data during operation.

Data storage system 105 may comprise a logical configuration in which various storage devices 216 in the data storage system 105 are configured as one or more logical objects, logical subsystems, logical unit numbers, and/or logical volumes. For example, a storage system administrator may create a logical configuration for the data storage system 105 using the z/Architecture® provided by IBM Corporation. The storage devices 216 may be accessed through various physical and logical paths, and various communication paths between a host 102 and a storage controller 105.

Figure 3:
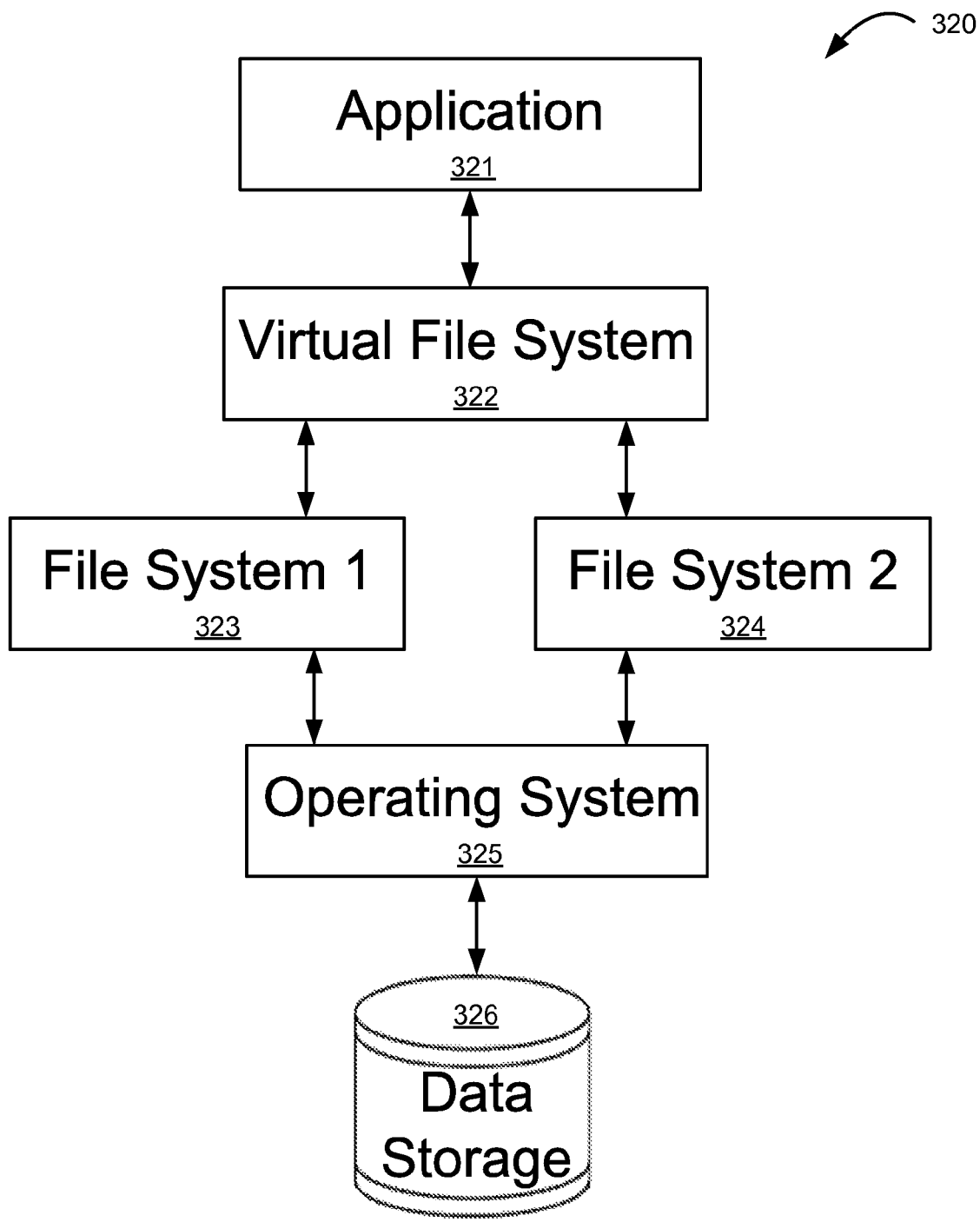
FIG. 3 illustrates a block diagram of a virtual file system, concrete file systems, and a virtual file system interface in which aspects of the invention may be provided.

FIG. 3 illustrates an exemplary virtual file configuration 320 in which embodiments of the invention may be provided. The virtual file configuration 320 may comprise multiple file systems 323-324 that run on top of operating system 325. Operating system 325 manages various tasks in a computer system on which the virtual file configuration 320 is set up, including data input/output operations from the file systems 323-324 for reading data from and storing data onto a data storage system 326. File systems 323-324 are computer software utilities that organize computer data as structures of data files to facilitate the storing of data, retrieving previously stored data, updating the data, and managing the space in a data storage system where the files are stored. Examples of file systems include the File Allocation Table (FAT) file system, Extended file system (ext), and IBM General Parallel File System™ (GPFS). File systems organize data in an efficient manner and are generally tuned to the specific characteristics of a particular data storage device. A file system may be tightly coupled to the operating system running on the computer system hosting the file system. Some file systems further provide mechanisms to control access to the data and metadata.

File systems are typically used on data storage devices such as magnetic storage disks or optical discs to maintain the physical location of the computer files. They may provide access to data on a file server by acting as clients for a network protocol (e.g., Network File System, Server Message Block, and Plan 9 File System protocols), or they may be virtual and exist only as an access method for virtual data (e.g., the proc File System). Data are stored in a file system as individual files which are referenced by file names. Computer applications generally access files in the file system through a file system interface such as File System In UserSpace (FUSE) and Portable Operating System Interface for Unix™ (POSIX). A file system interface may impose certain restrictions on the file names used in the file system.

A file system 323-324 may include directories or folders which are groups of files. A user or an application may store a group of related files in a directory for the purposes of organizing the files and accessing them. The relationships among the files in a file system may be maintained in an index table of contents, e.g., an independent node (inode) in a Unix-like file system. Directory structures may be in the form of a flat (linear) organization or a hierarchy where a directory may contain subdirectories.

Bookkeeping information about each file in a file system is referred to as metadata and may be maintained in the same file system or in a separate file system. An example of file metadata is the length of the data contained in a file, which may be stored as the number of blocks allocated for the file or as a byte count. The time that the file was last modified may be stored as the file's timestamp. File systems might store the file creation time, the time it was last accessed, the time the file's metadata was changed, or the time the file was last backed up. Other information can include the file's device type (e.g., block, character, socket, subdirectory, etc.), its owner user ID and group ID, and its access permission settings (e.g., whether the file is read-only, executable, etc.).

Additional attributes can be associated with files in a file system. Some file systems provide for user defined attributes such as the author of the document, the character encoding of a document or the size of an image. Other file systems may allow for different data collections to be associated with one file name. These separate collections may be referred to as streams or forks. Some file systems maintain multiple past revisions of a file under a single file name; the filename by itself retrieves the most recent version, while prior saved version can be accessed using a special naming convention such as "filename;4" or "filename(-4)" to access the version four saves ago.

A virtual file system 322 is an abstraction layer between an application 321 and the file systems 323-324, as just described. The purpose of a virtual file system 322 is to allow client applications 321 to access different types of file systems 323-324 in a uniform way. A virtual file system 322 can, for example, be used to access local and network storage devices transparently without the client application noticing the difference. It can be used to bridge the differences in the file systems 323-324 designed for different operating systems, so that applications can access files on local file systems 323-324 of those types without having to know what type of file system they are accessing.

A virtual file system 322 may specify an interface (or a "contract") between the kernel of an operating system 325 and a concrete file system 323-324. It is generally simple to add support for new file system types to the kernel by fulfilling the contract. The terms of the contract might change incompatibly from release to release, which would require that concrete file system support be recompiled, and possibly modified before recompilation, to allow it to work with a new release of the operating system; or the supplier of the operating system 325 might make only backward-compatible changes to the contract, so that concrete file system support built for a given release of the operating system 325 would work with future versions of the operating system.

An example of a virtual file system interface is the File System in UserSpace (FUSE) mechanism that allows user application code to plug into a virtual file system 322 in a Linux or FreeBSD operating system environment. FUSE is a loadable kernel module for Unix-like computer operating systems that lets non-privileged users create their own file systems without editing kernel code. This is achieved by running file system code in user space while the FUSE module provides only a "bridge" to the actual kernel interfaces. FUSE is particularly useful for writing virtual file systems. Unlike traditional file systems that essentially save data to and retrieve data from disk, virtual file systems do not actually store data themselves. They act as a view or translation of an existing file system or storage device. Any resource available to a FUSE implementation can be exported as a file system.

In another embodiment, the virtual file system interface may be a POSIX interface (i.e., Portable Operating System Interface for Unix). POSIX is a standard operating system interface and environment that includes a command interpreter (or "shell"), and common utility programs to support applications portability at the source code level.

Figure 4:
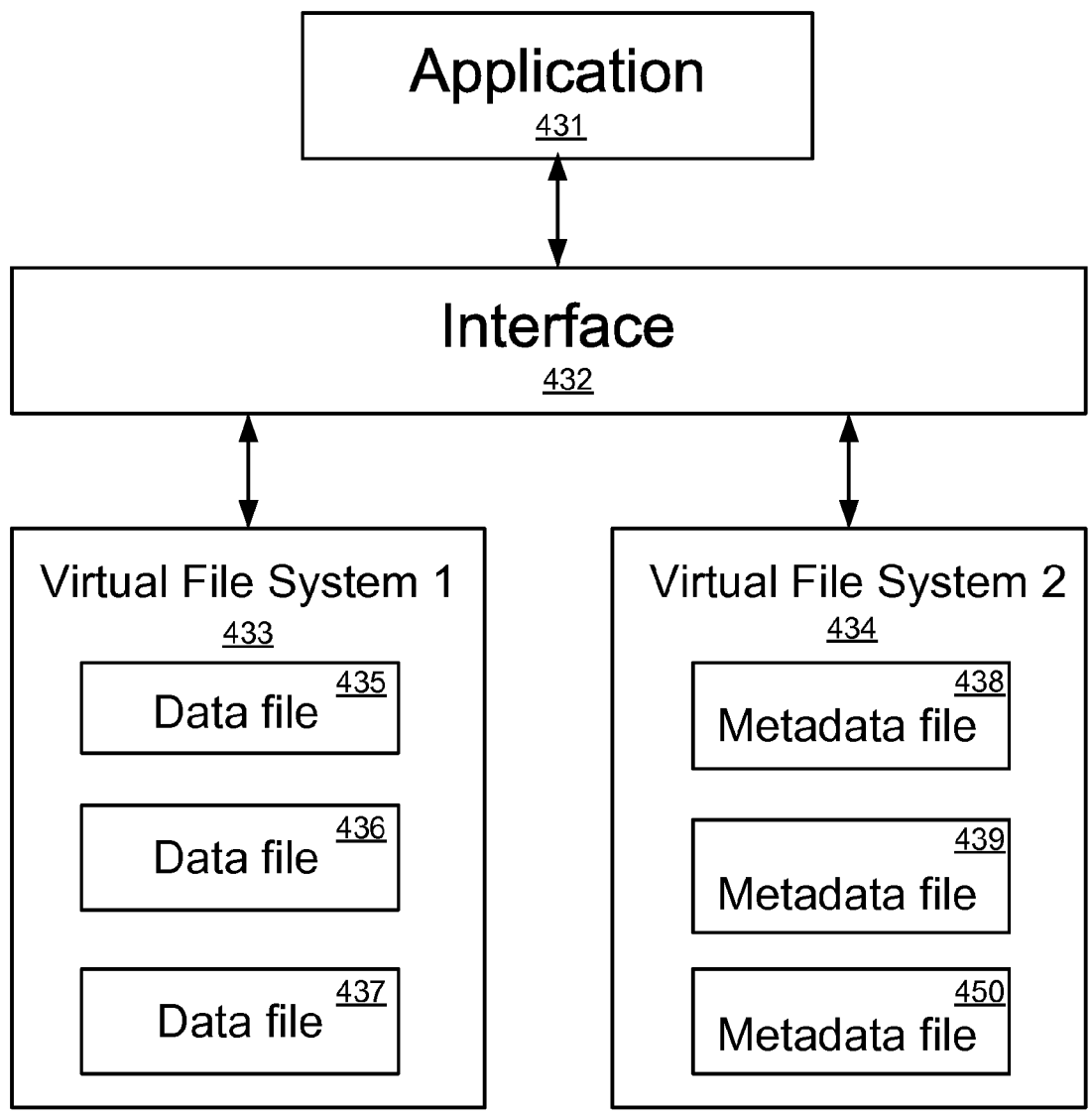
FIG. 4 illustrates a block diagram of virtual file systems containing data files and metadata files, and a virtual file system interface for providing aspects of the invention, in accordance with an exemplary embodiment.

FIG. 4 illustrates a block diagram of an exemplary embodiment of the invention that comprises a virtual file system interface for exposing changes in the metadata of data archived in a storage system. The archived data may be in the form of data files 435-437 which are maintained in a virtual file system 433. As described with reference to FIG. 3, the virtual file system 433 may operate with a concrete file system (not shown) that directly organizes the data into files 435-437 and manages these files, including access to the files and their maintenance. The virtual file system 433 may comprise, for example, the file name space, file data, and extended attributes of the data. Metadata related to the archived data files 435-437 may reside in metadata files 438-450 which respectively correspond to the archived data files 435-437. Metadata files 438-450 may include control data as well as other types of data concerning the data files 435-437. The illustrated embodiment may maintain the metadata files 438-450 in a second virtual file system 434.

The file configuration 400 may provide an interface 432 that is coupled to the file systems 433-434 to expose changes to the metadata files 438-450 to the data files 435-437. Such changes may include, for example, file level versions, types of change, dates of change, and authors. The FUSE interface 432 may detect changes to the metadata files 438-450 by looking for new file attributes or those that are modified or deleted. In one embodiment, the interface 432 is a FUSE interface that reads and parses extended attributes of the data files 435-437. Such extended attributes may be defined either by the system or the users. The FUSE interface 432 may further generate information that is generic in nature such as the storage tier location of a data file 435-437. A storage tier location query may be implemented using FUSE interface operations "open" and "read( )" which are responsible for creating and rendering contents of control metadata.

As an example, in a storage environment that use a Generalized Parallel File System (GPFS) as a file system and IBM Tivoli Storage Manager™ (TSM) for data storage management, a storage tier location query may be sent to each server managing the storage tier to determine the location of a particular file, including the Tivoli Storage Manager™ server responsible for managing two storage tiers in this example. If the data is not available in the first storage tier that was queried, the FUSE interface may query the next storage tier for the data. In addition, the FUSE interface may initiate queries to determine the storage pool for a given file. The FUSE interface 432 may further perform operations to determine the storage tier where the file data is first available. For example, the FUSE interface 432 will internally issue commands to determine the value of the attribute "<_SYSTEM_locationTier_>offline-tape</_SYSTEM_locationTier_>", which indicates the location of the storage tier for an archived file to be used by applications <add yr box # as applicable>. Once the storage tier information is available, the FUSE interface 432 may add this information to the metadata file associated with the archived file.

The FUSE interface 432 may reprocess part of the ingestion steps on the archived data files 435-437 when it detects changes in metadata files 438-450. Ingestion steps may include, for example, calculating "md5sum" values for the data, making the archived data files immutable based on a retention policy (i.e., locking the files), and setting retention periods for the files. The FUSE interface 432 may further re-index the files for later searches and copy data to a lower tier of storage in preparation for a later eviction of the data from the current tier. The FUSE interface 432 may enable the creation, modification, and deletion of attributes pertaining to the archived data files 435-437. For example, a user can open a control metadata file 438-450 to add or remove any data fields that are supported by the schema for the virtual file system 434 that contains the metadata. Note that each metadata file 438-450 does not need to include all the data fields that are supported by the schema, but only those that are applicable to the corresponding data file 435-437.

Figure 5:
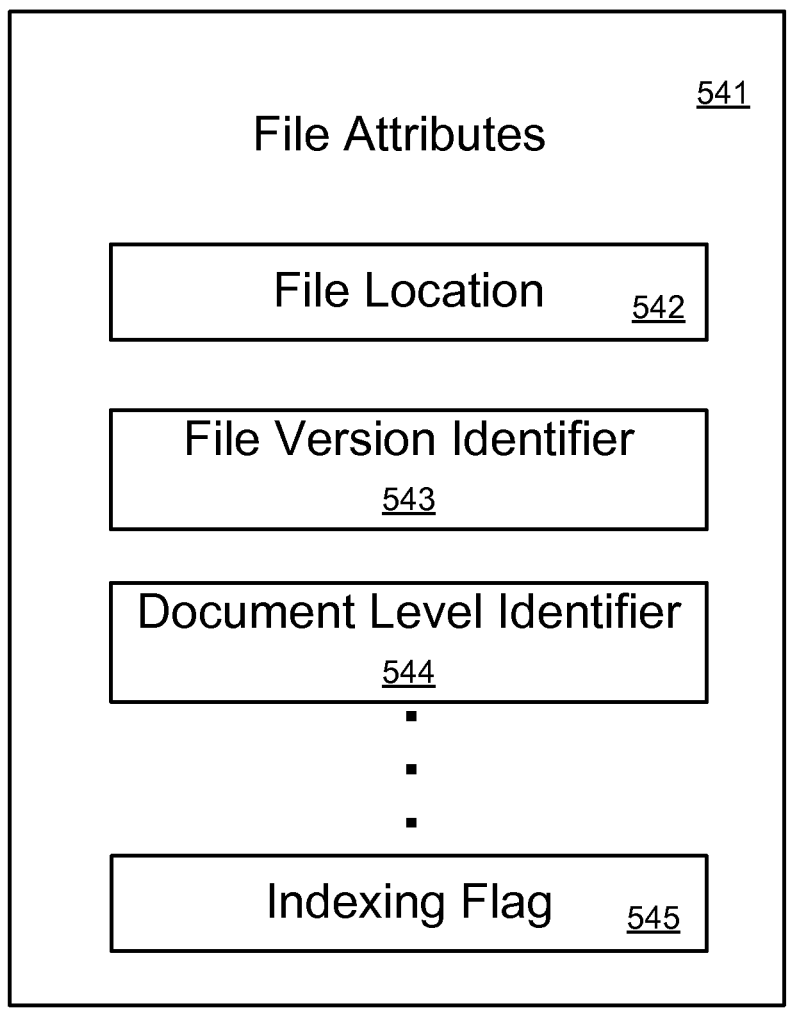
FIG. 5 illustrates exemplary file attributes associated with a data file, in accordance with an embodiment of the invention.

FIG. 5 illustrates some exemplary file attributes for an archived data file, in accordance with an embodiment of the invention. File attributes 541 may include a file location field 542 that contains the storage tier level in which a data file is stored in a data storage system. A file version identifier 543 may indicate a version number of an archived data file while document level identifier 544 may indicate a release level of a document. File attributes 541 may include an indexing flag 545 to indicate that certain data fields in the corresponding archived data file have changed and the file needs to be re-indexed in order to support a future search operation. Other file attributes may be provided as required by the data files that the attributes pertain to.

The XML code below provides an example metadata file created by a FUSE interface for a corresponding data file in a mounted FUSE file system. Lines 9 and 10 of the example indicate state and error conditions of the data file.

```
1.  <?xml version="1.0" encoding="UTF-8" ?>
2.
3.  <fields>
4.
5.  <_SYSTEM_minimumRetention_>2012-02-13T06:33:15+
        0000</_SYSTEM _minimumRetention_>
6.  <_SYSTEM_serviceClass_>
    IADefault</_SYSTEM_serviceClass_>
7.  <_SYSTEM_md5Checksum_
    >5639fef2f01ba0836e0bf7ee1fc9db01</
    SYSTEM_md5Checksum_>
8.  <_SYSTEM_retained_>2011-02-13T06:33:15+
        0000</_SYSTEM_retained_>
9.  <_SYSTEM_indexError_>137</_SYSTEM_indexError_>
10. <<_SYSTEM_MD5SUMError_>237
    </_SYSTEM_MD5SUMError>
11. <_SYSTEM_locationTier_>offline-
    tape</_SYSTEM_locationTier_>
12. <_USER_myString_>A string value.</_USER_myString_>
13. <_USER_myBoolean_>true</_USER_myBoolean_>
14. <_USER_myInteger_>623</_USER_myInteger_>
15. <_USER_myFloat_>3.14</_USER_myFloat_>
16. <_USER_myDate_>1995-12-
    31T23:59:59.999Z</_USER_myDate_>
17.
18. </fields>
```

Figure 6:
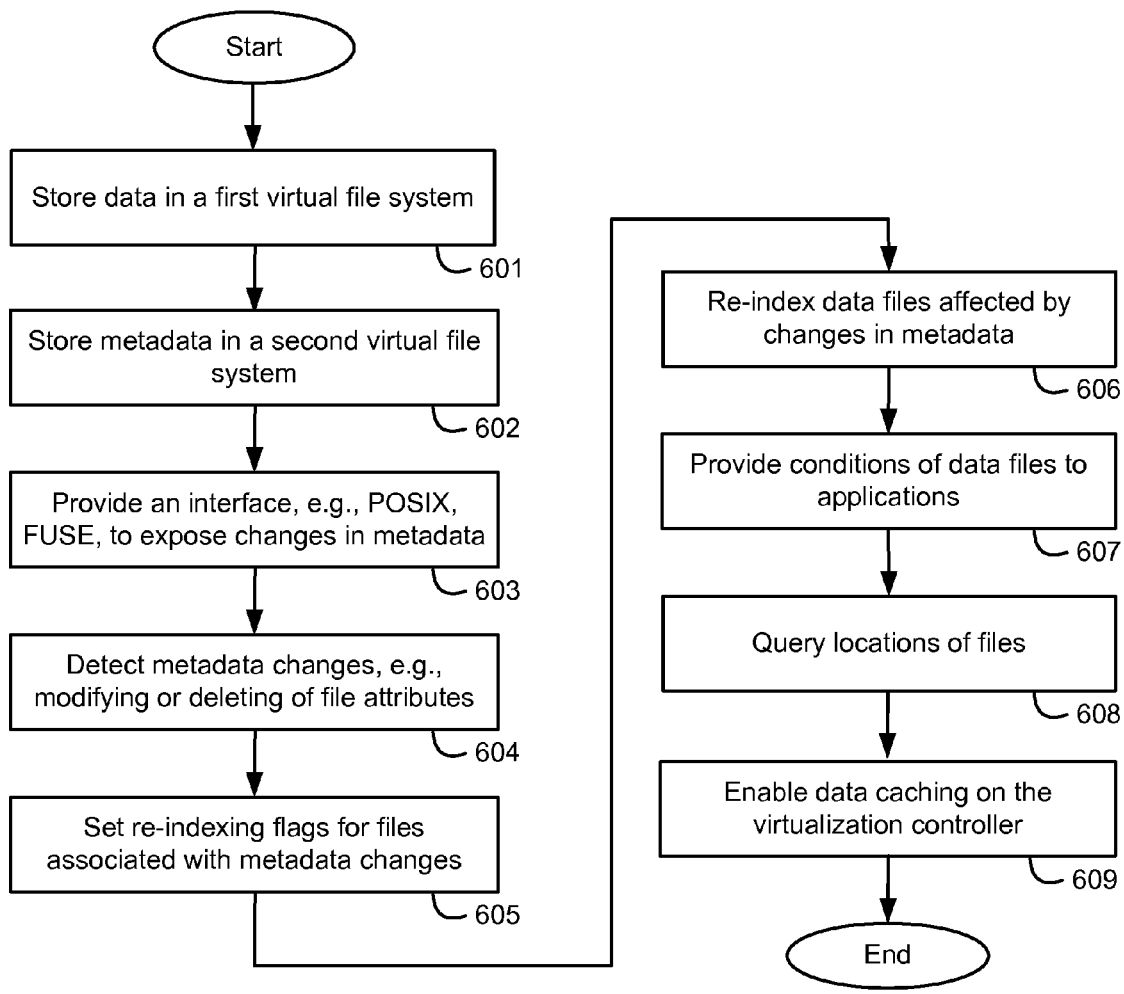
FIG. 6 is a flowchart of an exemplary process for exposing changes in metadata of archived data to applications, in accordance with an embodiment of the invention.

FIG. 6 is a flowchart of an exemplary embodiment of a process for exposing changes in metadata of archived data to applications. The steps in the process embodiment may be performed in sequence different from the illustrated sequence. The process may be implemented in a data storage system similar to the system 105 described with reference to FIGS. 1-4. Data may be stored as archived data files in a virtual file system 433 at block 601. Metadata related to the archived data, for example, file attributes, creation and change dates, and author names may reside in a second virtual file system 434, at block 602. As described with reference to FIG. 3, the virtual file systems 433-434 may operate with concrete file systems 323-324 to provide transparent and consistent support for file systems that are designed to run on different operating systems 325. To expose changes in the metadata to the applications that access the archived data files, the data storage system 105 may include a file system interface 432 such as FUSE or POSIX that is coupled to the virtual file systems 433-434, at block 603.

Through the file system interface 432, the storage system 105 may detect changes in the metadata such as newly created file attributes 541, and the file attributes 541 that have been modified or deleted, at block 604. File attributes 541 may include, for example, file location identification information, document level, file version level, file creation and change dates, authors, and file indexing flags. The changes to the file metadata may consequently require the affected files to be re-indexed so that the files may be correctly searched by search utilities in the future. Thus, at block 605, the storage system 105 may set re-indexing flags for the data files whose attributes have changed. The storage system 105 may later perform a re-indexing of the affected files, at illustrated in block 606. In an exemplary embodiment, once the user changed a data field in a file, a "Write( )" system call by a FUSE interface 432 may perform two functions: updating the corresponding extended attribute in the file system that is related to the data field, and updating another extended attribute that has been defined by the system to flag the first extended attribute has been changed. The second extended attribute may later be used by a system driver to trigger a re-indexing of the affected file at the next re-indexing opportunity.

The file system interface 432 may provide the conditions of the archived files that it has obtained from the changes in metadata to applications accessing the stored data, at block 607. During their operation, the applications may issue further queries on the archived files, such as requesting information on the location of a particular file in a hierarchical data storage system, e.g., storage tier level of the file, at block 608.

Figure 7:
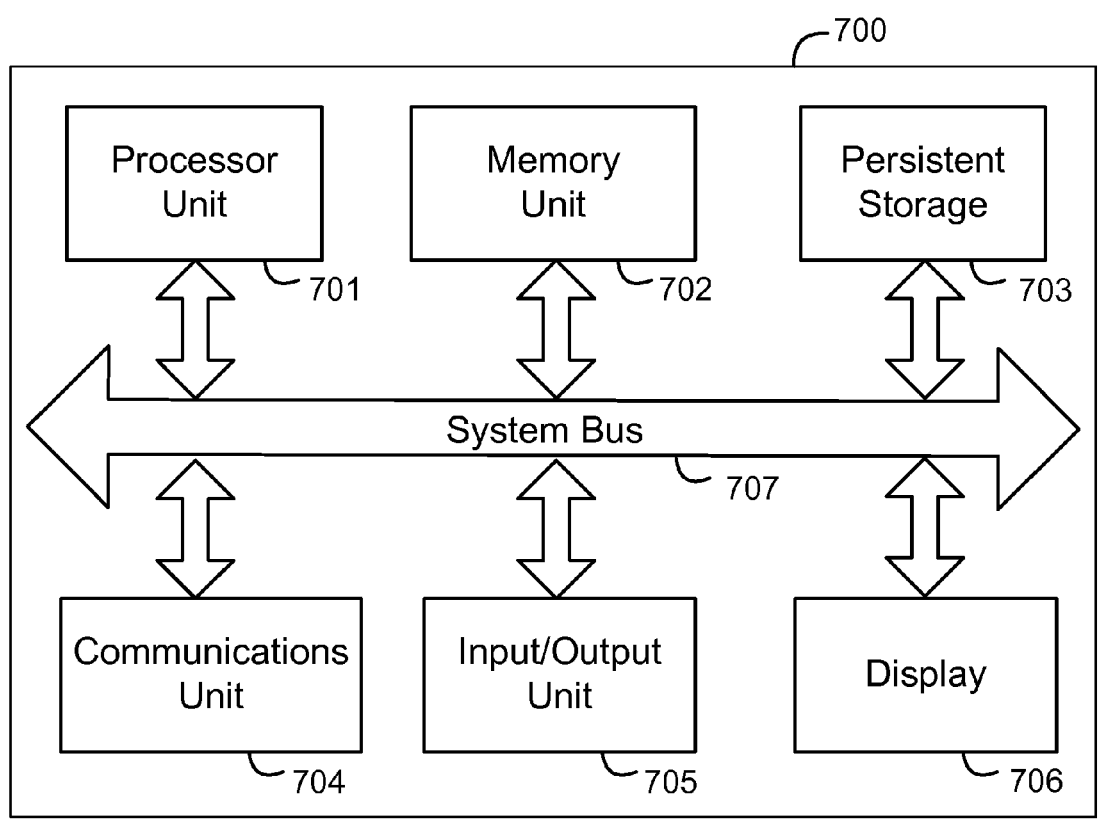
FIG. 7 illustrates a block diagram of a representative computer system that may be used with a data storage system or a virtual file system interface, according to an embodiment of the invention.

FIG. 7 illustrates a block diagram of a representative computer system that may be part of client computer 701, host computers 103-104, and storage controllers 106-107. Computer system 700 may include a processor unit 701, a memory unit 702, a persistent storage 703, a communications unit 704, an input/output unit 705, a display 706 and a system bus 707. Computer programs are typically stored in persistent storage 703 until they are needed for execution by an operating system running in memory unit 702. At that time, the programs are brought into the memory unit 702 so that they can be directly accessed by the processor unit 701. The processor unit 701 selects a part of memory unit 702 to read and/or write by using an address that the processor 701 gives to memory 702 along with a request to read and/or write. Usually, the reading and interpretation of an encoded instruction at an address causes the processor 701 to fetch a subsequent instruction, either at a subsequent address or some other address. The processor unit 701, memory unit 702, persistent storage 703, communications unit 704, input/output unit 705, and display 706 interface with each other through the system bus 707.

As will be appreciated by one skilled in the art, aspects of the present disclosure may be embodied as a method, system or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer read-able medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and substitutions of the described components and operations can be made by those skilled in the art without departing from the spirit and scope of the present disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A system comprising:
   a processor;
   a memory device having computer program instructions executed by the processor to perform operations, the operations comprising:
      providing a first virtual file system for storing archived data files;
      providing a second virtual file system for storing metadata files, wherein metadata for the archived data files in the first virtual file system resides in the metadata files in the second virtual file system, wherein each of the metadata files is associated with one of the archived data files, wherein each of the first and second virtual file systems comprise an abstraction layer between an application and a file system to provide an interface between a kernel of an operating system and the file system;
      providing an interface coupled to the first and second virtual file systems;
      detecting, by the interface, metadata file changes in the second virtual file system from changes to file attributes for the archived data files indicated in the metadata files; and
      providing, by the interface, changes in the metadata files to applications using the archived data files.

2. The system of claim 1, wherein the metadata files comprise control data.

3. The system of claim 2, wherein the control data comprise conditions of the archived data files.

4. The system of claim 3, wherein the conditions of the archived data files comprise at least one of a location of one of the archived data files, an archived data file version identifier, and an archived document index level identifier.

5. The system of claim 1, wherein the changes include at least one of creating, deleting, and modifying a data file attribute.

6. The system of claim 1, wherein in response to a change in one of the metadata files, the interface sets a flag to indicate that the archived data file corresponding to the changed metadata file is to be re-indexed.

7. The system of claim 1, wherein the interface allows a system-wide deletion of a data file attribute.

8. The system of claim 1, wherein the interface is a POSIX interface.

9. The system of claim 1, wherein the interface is a Filesystem in Userspace (FUSE) interface.

10. A computer implemented method comprising:
    providing a first virtual file system for storing archived data files;
    providing a second virtual file system for storing metadata files, wherein metadata for the archived data files in the first virtual file system resides in the metadata files in the second virtual file system, wherein each of the metadata files is associated with one of the archived data files, wherein each of the first and second virtual file systems comprise an abstraction layer between an application and a file system to provide an interface between a kernel of an operating system and the file system;
    detecting, by an interface coupled to the first and second virtual file systems, metadata file changes in the second virtual file system from changes to file attributes for the archived data files indicated in the metadata files; and
    providing, by the interface, changes in the metadata files to applications using the archived data files.

11. The method of claim 10, wherein the metadata files comprise conditions of the archived data files.

12. The method of claim 10, wherein the metadata file changes comprise making the archived data file immutable based on a retention policy.

13. The method of claim 10, wherein in response to a change in one of the metadata files, the interface sets a flag to indicate that the archived data file corresponding to the changed metadata file is to be re-indexed.

14. The method of claim 10, wherein the interface is a Filesystem in Userspace (FUSE) interface.

15. A computer program product comprising a non-transitory computer readable storage medium having computer readable program code embodied therewith, the computer readable program code comprising:

program code configured to provide a first virtual file system for storing archived data files;

program code configured to provide a second virtual file system for storing metadata files, wherein metadata for the archived data files in the first virtual file system resides in the metadata files in the second virtual file system, wherein each of the metadata files is associated with one of the archived data files, wherein each of the first and second virtual file systems comprise an abstraction layer between an application and a file system to provide an interface between a kernel of an operating system and the file system;

program code configured to detect, through an interface, metadata file changes in the second virtual file system, changes to file attributes for the archived data files indicated in the metadata files; and program code configured to provide, through the interface, changes in the metadata files to applications using the archived data files.

16. The computer program product of claim 15, wherein in response to a change in one of the metadata files, the interface sets a flag to indicate that the archived data file corresponding to the changed metadata file is to be re-indexed.

17. The computer program product of claim 15, wherein the interface provides conditions of the archived data files in the first virtual file system, the conditions comprising at least one of a location of one of the archived data files, an archived data file version identifier, and an archived document level identifier.

18. The computer program product of claim 15, wherein the changes include at least one of creating, deleting, and modifying a file attribute.

19. The system of claim 1, wherein the metadata file changes comprise making the archived data file immutable based on a retention policy.

20. The computer program product of claim 15, wherein the metadata file changes comprise making the archived data file immutable based on a retention policy.

* * * * *